United States Patent [19]

Masur

[11] 4,441,274

[45] Apr. 10, 1984

[54] FISHING LURE HOLDER

[76] Inventor: John J. Masur, 4460 Bedford Ave., Omaha, Nebr. 68111

[21] Appl. No.: 403,033

[22] Filed: Jul. 29, 1982

[51] Int. Cl.³ ............................................. A01K 97/06
[52] U.S. Cl. .................................................... 43/25.2
[58] Field of Search ........................... 43/25.2, 26, 54.1

[56] References Cited

U.S. PATENT DOCUMENTS

| | | | |
|---|---|---|---|
| 2,627,133 | 2/1953 | Pletcher | 43/25.2 |
| 2,767,502 | 10/1956 | Reynolds | 43/25.2 |
| 3,199,243 | 8/1965 | Caston | 43/25.2 |
| 3,484,980 | 12/1969 | Wait | 43/57.1 |
| 4,015,361 | 4/1977 | O'Reilly | 43/25.2 |
| 4,203,245 | 5/1980 | Peterson | 43/25.2 |
| 4,216,604 | 8/1980 | Starke | 43/25.2 |

Primary Examiner—Gene P. Crosby
Attorney, Agent, or Firm—Zarley, McKee, Thomte, Voorhees & Sease

[57] ABSTRACT

A holder or container for storing a fishing lure is described and comprises first and second container portions which are normally spaced apart but which are positioned adjacent each other when the container is moved from its open position to its closed position. Each of the container portions is provided with a peripheral rim which defines a storage compartment with the peripheral rims of each storage compartment being in engagement with each other when the container is in its closed position. The inner peripheral rims of each of the container portions is spaced apart to permit the rod to be positioned therebetween when the container is mounted on the rod. The inner peripheral rims of each of the container portions has a V-shaped portion which is adapted to receive the line guide of the rod so that the container will not rotate when mounted on the rod. When the container is mounted on the rod, the fishing line passes through a slit formed in the peripheral rim to permit the fishing lure on the end of the line to be positioned within the storage compartment area of the container.

5 Claims, 5 Drawing Figures

FISHING LURE HOLDER

BACKGROUND OF THE INVENTION

This invention relates to a fishing lure container and more particularly to a fishing lure container which may be mounted on a fishing rod in such a manner so that the fishing line and fishing lure will not become entangled.

Many types of fishing lure holders or containers have been previously provided in an effort to prevent entanglement of the lines and the hooks when the rods are being moved from one location to another. For example, see U.S. Pat. Nos. 4,203,245; 3,484,980; 3,199,243; and 4,216,604.

Although the devices of the prior art may function with limited success, certain of the containers or holders are not positively positioned on the rods in that they will rotate with respect to the rod which will cause entanglement of the line. Further, the devices of the prior art do not have ample storage room therein and are not able to permit the storage of live bait therein.

Therefore, it is a principle object of the invention to provide an improved container for storing a fishing lure on a fishing rod.

A further object of the invention is to provide a fishing lure holder which does not have any protruding surfaces.

Still another object of the invention is to provide a fishing lure holder which includes means for preventing its rotation with respect to the fishing rod.

Still another object of the invention is to provide a fishing lure holder which can accommodate live bait.

Still another object of the invention is to provide a fishing lure holder which has ample storage space therein.

Still another object of the invention is to provide a fishing lure holder which is economical of manufacture, durable in use and refined in appearance.

SUMMARY OF THE INVENTION

Figure 1:
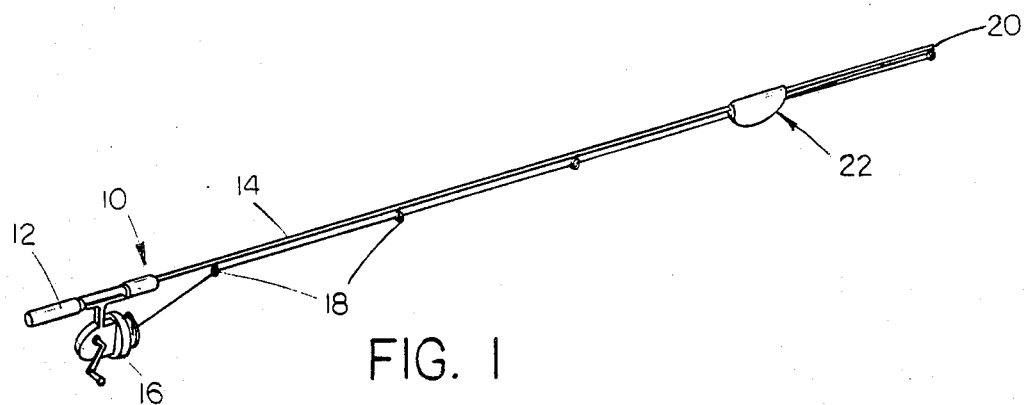
FIG. 1 is a perspective view of a fishing rod having the holder of this invention mounted thereon.

A fishing lure holder is described comprising a container movable between open and closed position. The container comprises first and second container portions including peripheral rim portions extending therearound which define storage compartments therein. The inner peripheral rims of each of the container portions are spaced apart when the container is in its open position, to permit the fishing rod to be received therebetween. The inner peripheral rims of the container portions are V-shaped to permit a line guide to be received therebetween which prevents the container rotating relative to the rod when in its closed position.

DESCRIPTION OF THE PREFERRED EMBODIMENT

Referring to the drawings, the numeral 10 refers to a spinning rod including a grip 12, rod portion 14, reel 16 and line guides 18. For purposes of description, the numeral 20 will refer to the tip of the rod.

Figure 2:
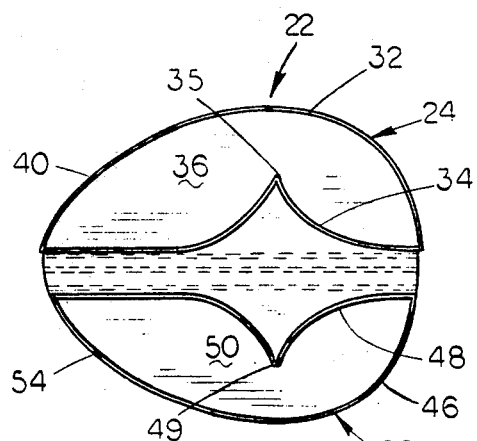
FIG. 2 is a planned view of the holder in an open position.
Figure 3:
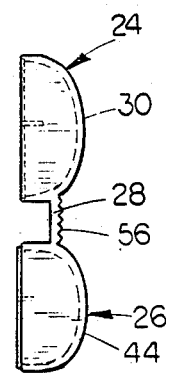
FIG. 3 is an end elevational view of the holder of this invention.
Figure 4:
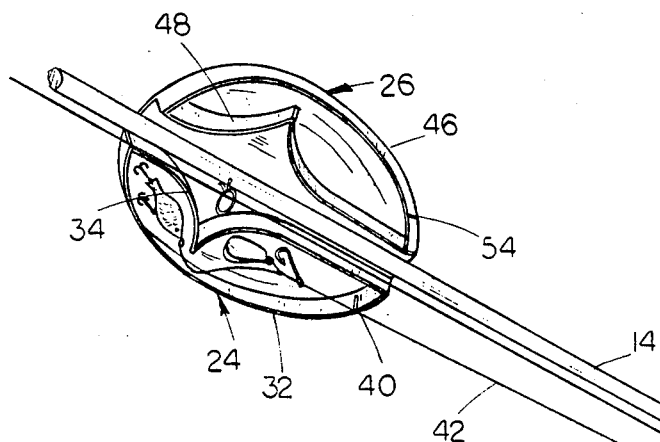
FIG. 4 is a perspective view illustrating the holder mounted on a fishing rod with the holder being in its open position.
Figure 5:
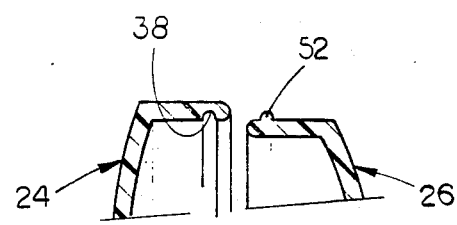
FIG. 5 is a partial sectional view illustrating the closure means for the container.

The numeral 22 refers to the container of this invention which is comprised of a suitable flexible plastic material designed to be moved from the substantially flat position of FIGS. 2 and 4 to the folded or closed position of FIG. 1. Container 22 is comprised of container portions 24 and 26 joined by an intermediate portion 28. Container portion 24 includes an outer concaval-convex surface 30 having a rim 32 extending inwardly therefrom. Container portion 24 also includes a rim 34 which in cooperation with rim 32 defines a compartment area 36. Rims 32 and 34 are provided with an indentation 38 formed for a purpose to be described in more detail hereinafter. Rim 32 is provided with a slit 40 formed therein to enable the fishing line 42 to pass therethrough. Rim 34 includes a V-shaped portion 35.

Container portion 26 is slightly smaller than container portion 24 so that the container portion 26 can "nest" within container portion 24. Container portion 26 includes a concaval-convex outer surface 44 having a rim 46 extending therefrom. Container portion 26 is also provided with a rim 48. Rim 48 includes a V-shaped portion 49. Rims 46 and 48 cooperate to define a compartment 50. Rims 46 and 48 are each provided with a protrusion 52 extending therefrom which is adapted to be received by the indentation 38 in the rims 32 and 34 when the container is moved to the closed position of FIG. 1. The engagement of the protrusions 52 with the indentations 38 not only maintain the container in its closed position but also serve to make the compartments 36 and 50 substantially watertight. The numeral 54 refers to a slit in rim 46 to permit entry of the line 42. The numeral 56 refers to a bend line area in the container to facilitate the bending of the container to its closed position.

In use, the container 22 is initially positioned on the rod 10 as seen in FIG. 4 so that the line guide 18 is positioned within one of the V-shaped portions 35 or 49. Line 42 is extended through one of the slits 40 or 54 so that the lure 58 may be positioned within compartmentj area 50 as seen. If desired, additional sinkers, etc. may be positioned within either of the compartment areas 36 or 50.

The container portions 24 and 26 are then moved towards one another so that protrusions 52 are received byl the indentations 38 to yieldably maintain the container 22 in its closed position on the fishing rod. When the container is in its closed position, the positioning of the guide 18 within the V-shaped areas prevents rotation of the container relative to the rod. The rims of the container portions engage one another so that compartment areas 36 and 50 form a single compartment which is substantially water tight, except for the slits 40 and 54, to permit the storage of live bait therein.

Thus, the container of this invention prevents the entanglement of the lures and lines during transport of the rod from one location to another and during storage. It can be seen that the invention accomplishes at least all of its stated objectives.

I claim:

1. In combination with a fishing rod having a handle, a rod portion having a plurality of spaced line guides, a reel, a fishing line extending from said reel through said guides, and a fishing lure on the end of said line, comprising, a closeable container comprising first and second container portions which are spaced apart when the container is in its open position and which are positioned adjacent each other when the container is in its closed position, each of said container portions having an outer peripheral rim portion and an inner peripheral rim portion which define a storage compartment therebetween, the inner peripheral rim portions of said container portions being spaced apart to permit the positioning of said rod portion therebetween, at least one of said outer peripheral rim portions having a slit formed therein to permit the fishing line to be extended thereby so that the fishing lure may be stored within one of said storage compartments, and means for maintaining said container in its closed position around said rod portion with said fishing lure within said one storage compartment, each of said inner peripheral rim portions defining a V-shape to permit one of said line guides to be received thereby to prevent the rotation of said container with respect to said rod portion when said container is positioned on said rod portion in its closed position.

2. The combination of claim 1 wherein said means for maintaining said container in its closed position comprises a friction closure means on said peripheral rim portions.

3. The combination of claim 1 wherein said container is mounted on said rod portion inwardly of the tip thereof.

4. The combination of claim 1 wherein said container is comprised of a transparent plastic material.

5. In combination with a fishing rod having a handle, a rod portion having a plurality of spaced line guides, a reel, a fishing line extending from said reel through said guides, and a fishing lure on the end of said line, comprising, a closeable container comprising first and second container portions which are spaced apart when the container is in its open position and which are positioned adjacent each other when the container is in its closed position, each of said container portions having an outer peripheral rim portion and an inner peripheral rim portion which define a storage compartment therebetween, the inner peripheral rim portions of said container portions being spaced apart to permit the positioning of said rod portion therebetween, at least one of said outer peripheral rim portions adapted to permit the fishing line to pass thereby so that the fishing lure may be stored within one of said storage compartments, and means for maintaining said container in its closed position around said rod portion with said fishing lure within said one storage compartment, each of said inner peripheral rim portions defining a configuration to permit one of said line guides to be received thereby to prevent the rotation of said container with respect to said rod portion when said container is positioned on said rod portion in its closed position.

* * * * *